(12) United States Patent
Andrews

(10) Patent No.: US 11,632,892 B2
(45) Date of Patent: Apr. 25, 2023

(54) REAR JACK FOR AN AGRICULTURAL IMPLEMENT

(71) Applicant: CNH Industrial America LLC, New Hollad, PA (US)

(72) Inventor: Jason E. Andrews, Goodfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 524 days.

(21) Appl. No.: 16/808,660

(22) Filed: Mar. 4, 2020

(65) Prior Publication Data

US 2021/0274698 A1    Sep. 9, 2021

(51) Int. Cl.
| | |
|---|---|
| A01B 63/11 | (2006.01) |
| B60D 1/62 | (2006.01) |
| B60D 1/66 | (2006.01) |
| A01B 59/042 | (2006.01) |

(52) U.S. Cl.
CPC ............ *A01B 63/11* (2013.01); *A01B 59/042* (2013.01); *B60D 1/62* (2013.01); *B60D 1/66* (2013.01)

(58) Field of Classification Search
CPC ......... A01B 63/11; A01B 59/042; B60D 1/62; B60D 1/66
See application file for complete search history.

(56) References Cited

U.S. PATENT DOCUMENTS

| | | | |
|---|---|---|---|
| 2,756,884 A | 7/1956 | Senkowski et al. | |
| 3,075,790 A | * 1/1963 | Hansen et al. ......... | B60D 1/465 |
| | | | 280/475 |
| 3,592,443 A | 7/1971 | Budrow et al. | |
| 6,779,616 B1 | 8/2004 | Brown | |
| 7,195,267 B1 | 3/2007 | Thompson | |
| 8,408,326 B2 | 4/2013 | Yuen et al. | |
| 8,678,420 B2 | 3/2014 | Gallego et al. | |
| 8,770,612 B2 | 7/2014 | Wendte et al. | |
| 9,469,171 B2 | 10/2016 | Morga et al. | |
| 9,834,049 B2 | 12/2017 | Strand | |
| 9,895,945 B2 | 2/2018 | Lavoie | |
| 9,924,625 B2 | 3/2018 | Huegerich | |
| 2002/0185838 A1 | 12/2002 | Shilitz et al. | |
| 2006/0042841 A1 | 3/2006 | Russell | |
| 2017/0234119 A1 | 8/2017 | Allen et al. | |

FOREIGN PATENT DOCUMENTS

| | | |
|---|---|---|
| GB | 1 407 667 | 9/1975 |
| GB | 2 179 318 A | 3/1987 |
| WO | 2010/147980 A2 | 12/2010 |

* cited by examiner

*Primary Examiner* — Tara Mayo
(74) *Attorney, Agent, or Firm* — Rebecca Henkel; Rickard DeMille

(57) ABSTRACT

An agricultural implement towable by an agricultural vehicle. The agricultural implement includes a frame with a front portion and a rear portion, a plurality of ground engaging tools connected to the rear portion, and a stabilization system. The stabilization system includes at least one stabilizer connected to the rear portion. The at least one stabilizer is remotely operated for selectively supporting the rear portion relative to the front portion and leveling the frame.

20 Claims, 4 Drawing Sheets

REAR JACK FOR AN AGRICULTURAL IMPLEMENT

BACKGROUND OF THE INVENTION

The present invention pertains to agricultural tillage implements and, more specifically, to a rear stabilization jack for an agricultural tillage implement.

Farmers utilize a wide variety of tillage systems to prepare soil for planting. For example, a strip tillage implement is capable of tilling soil in strips along the intended planting rows, moving residue to the areas in between rows, and preparing the seedbed of the strip in preparation for planting. As another example, a field cultivator is capable of simultaneously tilling soil and leveling the tilled soil in preparation for planting.

A tillage implement typically includes a frame that carries a number of cultivator shanks which can carry various tools for engaging the soil. The tools may include shovels, knives, points, sweeps, coulters, spikes, or plows. Each tool performs a function intended to ultimately convert compacted soil into a level seedbed with a consistent depth for providing desirable conditions for planting crops. A tillage implement may additionally include, or be connected with, other devices for inserting fertilizer following the passage of the cultivator shanks, closing the furrow created by the cultivator shanks, or breaking up the clods to create the uniform seedbed. For example, the tillage implement may be connected to an air cart which carries and injects fertilizer into the field.

Some tillage implements may additionally include one or more rear jacks to provide additional support to stabilize the implement when the implement is disconnected from the towing vehicle. For example, an implement that has heavy attachments or harrows at the rear of its frame may require a rear jack to balance the implement in order to keep the front hitch on the ground. Generally, to use the rear jack, the operator must climb on top of the implement and over the rear attachments to manually operate the rear jack. Once in position, the operator may need to rotate the rear jack from its storage position to its operating, support position. Then, the operator may be required to crank the rear jack to extend its length to achieve a desired support position. Thereafter, the operator may climb off of the implement to subsequently perform various other tasks. As can be appreciated, such known rear jacks can be difficult and cumbersome to operate. Additionally, rear jacks may become damaged if they are unknowingly left in their operating, support position. For instance, the operator may attach the implement and forget to position the rear jack in its storage position. Thereafter, the operator may move the implement, which then causes the rear jack to forcibly contact the ground, damaging the rear jack. Once broken, the rear jack must be repaired or replaced, otherwise the broken rear jack may improperly support the implement which may cause the implement itself to become damaged. Thereby, rear jacks can be tiresome to operate.

What is needed in the art is a cost-effective and automatic stabilization system for an agricultural tillage implement.

SUMMARY OF THE INVENTION

In one exemplary embodiment formed in accordance with the present invention, there is provided a stabilization system for an agricultural implement. The stabilization system includes a rear stabilizer connected to the rear portion of the frame of the agricultural implement and a remote switch that is distally located away from the stabilizer on the front portion of the frame. The stabilizer is selectively extendable in between a retracted position and an extended, support position wherein the stabilizer engages with the ground for supporting the rear portion and leveling the frame.

In another exemplary embodiment formed in accordance with the present invention, there is provided an agricultural implement towable by an agricultural vehicle. The agricultural implement includes a frame with a front portion and a rear portion. The front portion has a hitch configured for removably connecting to the agricultural vehicle. The agricultural vehicle also includes a plurality of ground engaging tools connected to the rear portion and a stabilization system. The stabilization system includes at least one stabilizer connected to the rear portion. The at least one stabilizer is remotely operated for selectively supporting the rear portion relative to the front portion and leveling the frame.

In yet another exemplary embodiment formed in accordance with the present invention, there is provided an agricultural vehicle that includes a chassis, a controller, and an agricultural implement. The agricultural implement includes a frame with a front portion and a rear portion. The front portion has a hitch removably connected to the chassis. The agricultural vehicle also includes a plurality of ground engaging tools connected to the rear portion and a stabilization system. The stabilization system includes at least one stabilizer connected to the rear portion. The at least one stabilizer is remotely operated for selectively supporting the rear portion relative to the front portion and leveling the frame.

In another exemplary embodiment formed in accordance with the present invention, there is provided a method for stabilizing agricultural equipment. The method includes an initial step of providing an agricultural implement that is towable by an agricultural vehicle. The agricultural implement includes a frame with a front portion and a rear portion. The front portion has a hitch configured for removably connecting to the agricultural vehicle. The agricultural vehicle also includes a plurality of ground engaging tools connected to the rear portion and a stabilization system. The stabilization system includes a remote switch and at least one stabilizer connected to the rear portion and operably connected to the remote switch. The at least one stabilizer is remotely operated for selectively supporting the rear portion relative to the front portion and leveling the frame. The method also includes extending the at least one stabilizer, by toggling the remote switch, to be in an extended support position wherein the at least one stabilizer contacts a ground surface for supporting a weight of the rear portion, and retracting the at least one stabilizer, by toggling the remote switch, to be in a retracted storage position wherein the at least one stabilizer does not contact the ground surface.

One possible advantage of the exemplary embodiment of the agricultural implement is that the rear stabilizer may be actuated remotely, i.e., at a distance away from the stabilizer, so that the operator may selectively support and level the frame of the agricultural implement without needing to climb on top of the frame to actuate the stabilizer.

Another possible advantage of the exemplary embodiment of the agricultural implement is that the stabilizer may be automatically lifted into its retracted position so that the operator need not worry about manually retracting the stabilizer or forgetting about the stabilizer and subsequently damaging the stabilizer and/or the agricultural implement upon moving the agricultural implement.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural tillage implement and/or components thereof are usually determined with reference to the direction of forward operative travel of the implement, they should not be construed as limiting. The terms "longitudinal" and "transverse" are determined with reference to the fore-and-aft direction of the agricultural tillage implement and are equally not to be construed as limiting.

Figure 1:
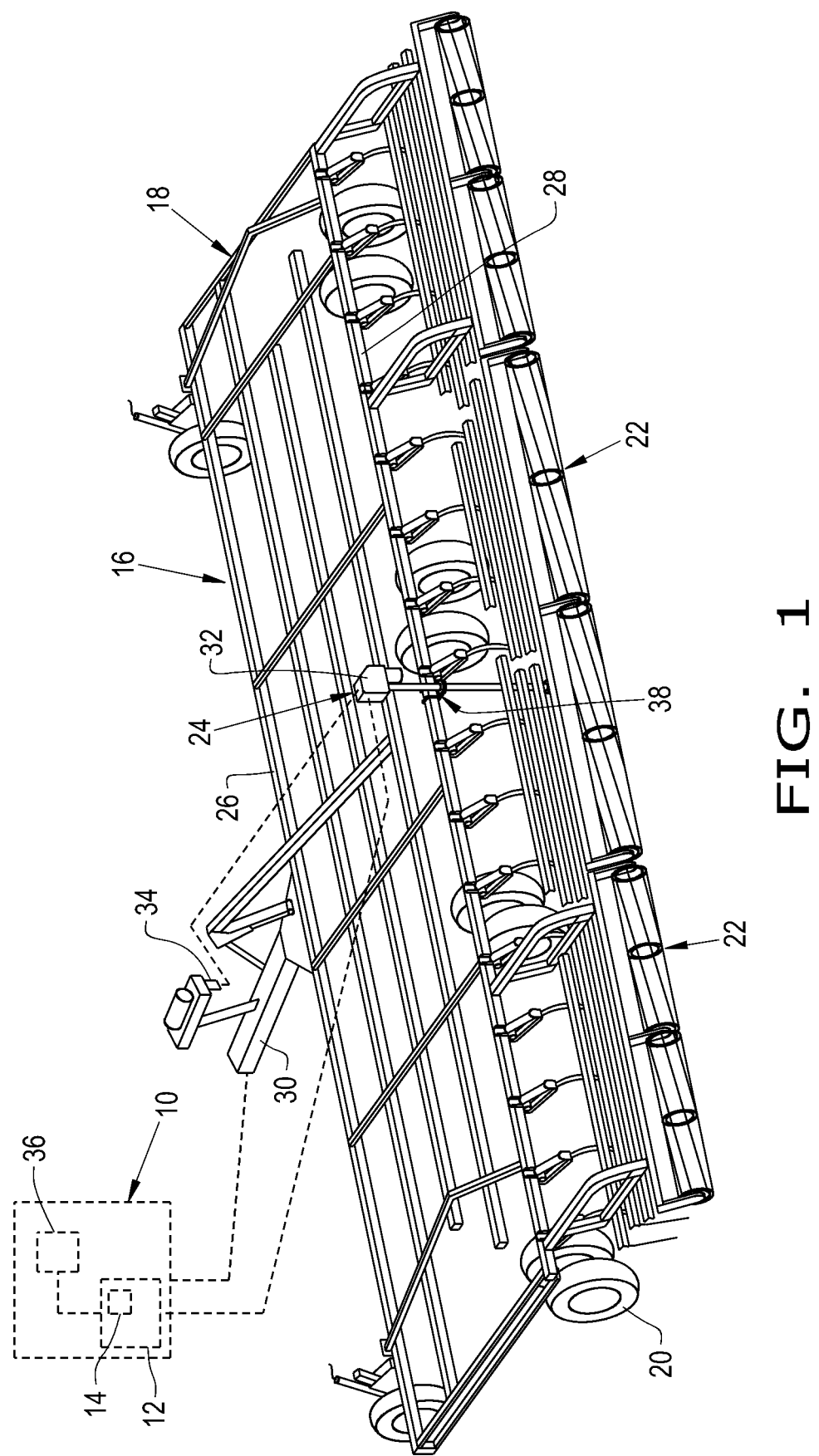
FIG. 1 illustrates a rear perspective view of an exemplary embodiment of an agricultural implement towable by an agricultural vehicle, the agricultural implement includes a stabilization system with a rear stabilizer for leveling the frame of the agricultural implement, in accordance with an exemplary embodiment of the present invention.
Figure 2:
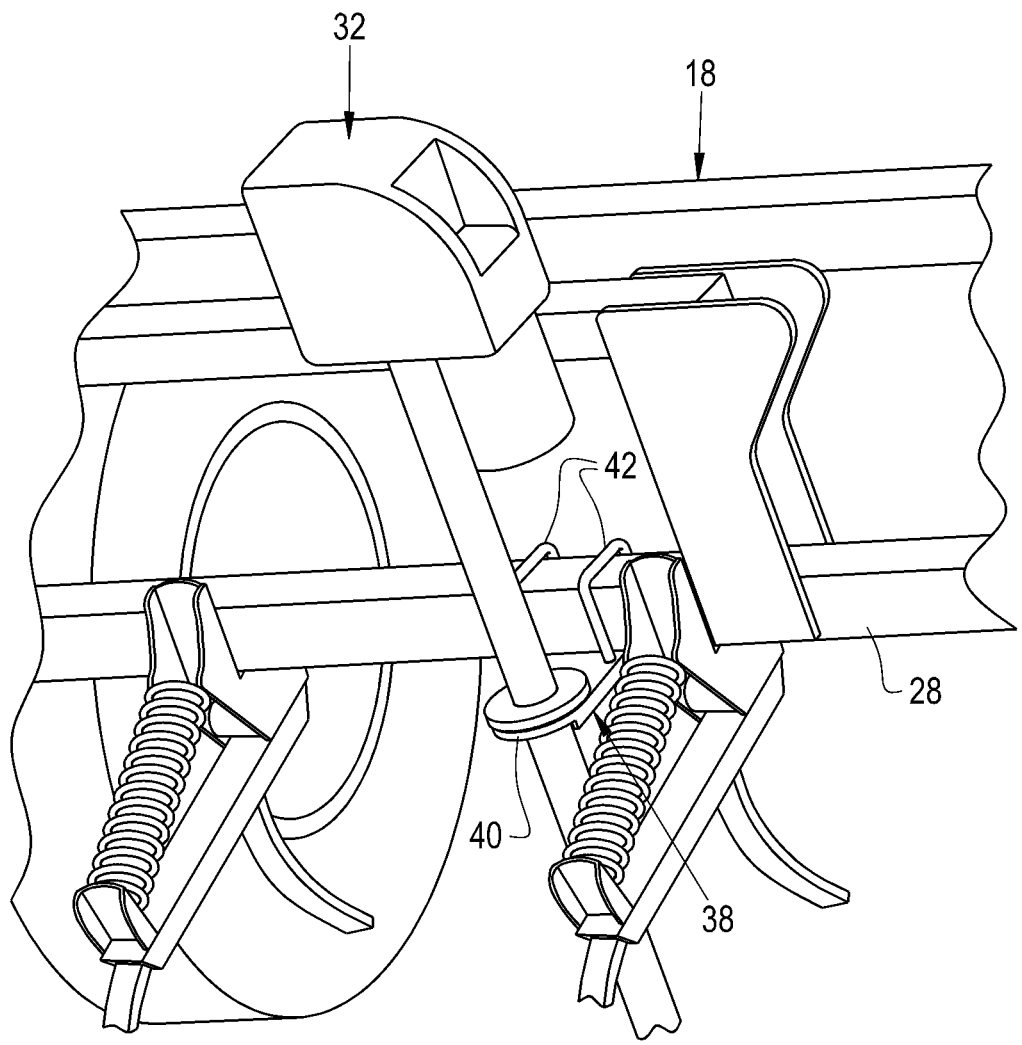
FIG. 2 illustrates a top perspective view of the rear stabilizer of FIG. 1.
Figure 3:
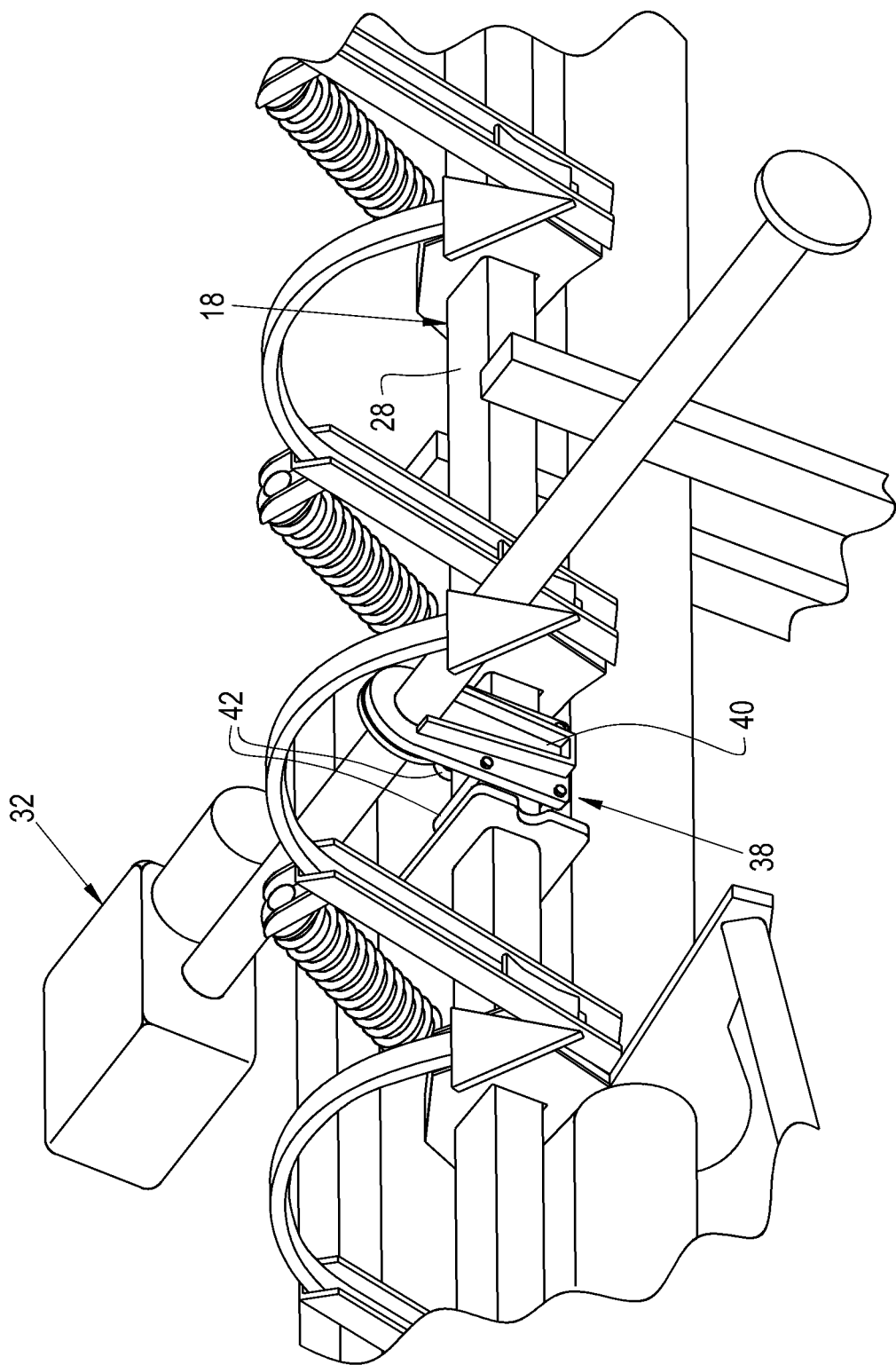
FIG. 3 illustrates a bottom perspective view of the rear stabilizer of FIGS. 1-2.

Referring now to the drawings, and more particularly to FIGS. 1-3, there is shown an agricultural vehicle 10 in phantom. The agricultural vehicle 10 generally includes a chassis, a prime mover, wheels supporting the chassis, a controller 12 with a memory 14, and an agricultural implement 16 removably connected to the chassis. The controller 12 may be in the form of a depth control system. The agricultural vehicle 10 may be in the form of any desired vehicle, such as a tractor.

The agricultural implement 16 may be in the form of any desired implement, such as a field cultivator. The agricultural implement 16 generally includes a frame 18, wheels 20 supporting the frame 18, multiple ground engaging tools 22, and a stabilization system 24 for stabilizing, e.g. leveling or balancing, the frame 18. For example, the stabilization system 24 may balance the frame 18 when the agricultural implement 16 is not connected to the agricultural vehicle 10 and/or when the agricultural implement 16 is connected to the agricultural vehicle 10 but the agricultural vehicle 10 and implement 16 are not presently in motion, i.e., stationary.

The frame 18 includes a front portion 26 and a rear portion 28. The front portion 26 may include a hitch 30 that removably connects to the chassis of the agricultural vehicle 10. The front and rear portions 26, 28 may support any desired tool for fertilizing and/or working the field. The front portion 26 may refer to a section of the frame 18 that is in front of the center of mass of the frame 18, and the rear portion 28 may refer to a section of the frame 18 that is behind of the center of mass of the frame 18. As can be appreciated, the front and rear portions 26, 28 may or may not correspond to a physical separation or structural divide within the frame 18.

The ground engaging tools 22 are connected to the frame 18. For example, one or more ground engaging tools 22 may be connected to the rear portion 28 of the frame 18, which may accordingly imbalance the frame 18 such that when the agricultural implement 16 is unhitched from the agricultural vehicle 10 the front portion 26 of the frame 18, and the hitch 30 therewith, may upwardly tilt. Accordingly, when the front portion 26 of the frame 18 is upwardly tilted, the ground engaging tools 22 at the rear portion 28 of the frame 18 may undesirably contact the ground. As shown, the ground engaging tools 22 comprise shanks and roller baskets; however, the ground engaging tools 22 may comprise any desired tool.

The stabilization system 24 includes at least one stabilizer 32 located at the rear portion 28 of the frame 18 and a remote switch 34 located at the front portion 26 of the frame 18 for remotely operating each stabilizer 32. Each stabilizer 32 selectively supports the rear portion 28 relative to the front portion 26 such that the frame 18 remains substantially level, i.e., horizontal, when it is unhitched from the agricultural vehicle 10. For example, each stabilizer 32 may be extendable in between a retracted storage position and an extended support position wherein the stabilizer 32 contacts the surface of the ground for supporting the weight of the rear portion 28 relative to the front portion 26 so that the ground engaging tools 22 at the rear portion 28 do not contact the surface of the ground. Thereby, since each stabilizer 32 is remotely operated, the operator does not need to climb on top of the frame 18 or come within arms-reach of the stabilizer 32 in order to actuate the stabilizer 32. Furthermore, the operator does not need to apply weights to the front portion 26 in order to keep the frame 18 level. As shown, the agricultural implement 16 includes only one stabilizer 32; however, the agricultural implement 16 may include two, three, or more stabilizers.

The stabilizer 32 is also operably connected to the remote switch 34 via a wired or wireless connection. Additionally or alternatively, the stabilizer 32 may be operably connected to the controller 12 via a wired or wireless connection. Hence, the stabilizer 32 may only be operably connected to the switch 34 or dually operably connected to the switch 34 and the controller 12. Thereby, the operator may manually control the operation of the stabilizer 32 via the switch 34 at the front portion 26 of the frame 18 or from within the cab of the agricultural vehicle 10 via inputting a user command into a user interface, such as a soil command screen of the controller 12. Furthermore, the controller 12 may automatically extend or retract the stabilizer 32 upon the operator unhitching the agricultural implement 16 and/or towing the agricultural implement 16. For example, the controller 12 may automatically retract the stabilizer 32 into its retracted position upon receiving a drive signal or speed signal from a corresponding sensor 36, such as a shift-selection sensor or speed sensor, of the agricultural vehicle 10. The sensor 36 may indicate that the agricultural vehicle 10 is moving or is about to move so that the stabilizer 32 is not damaged by a subsequent movement of the agricultural implement 16. The stabilizer 32 is also rigidly connected to the rear portion 28 of the frame 18. For example, the stabilizer 32 is rigidly connected to the rear portion 28 by at least one bracket 38. In other words, the stabilizer 32 may be affixed to the rear portion 28 such that the stabilizer 32 cannot pivot but is allowed to extend and retract. Each bracket 38 may include a flat a plate 40 that is coupled to the rear portion 28 of the frame 18 via welding and/or one or more fasteners 42, such as threaded U-bolts 42 (FIG. 2). The plate 40 has a first end connected to the rear portion 28 and a second end with a receiving hole (unnumbered) therein for receiving and securing at least a portion of the stabilizer 32.

Each stabilizer 32 may be in the form of a jack 32, such as an electromechanical or hydromechanical jack. For example, the jack 32 may comprise a hydraulic cylinder, a valve block, and a solenoid valve with a dedicated control circuit on the valve block. Additionally, for example, the jack 32 may comprise an electric cylinder with an electric motor coupled thereto. The electrical wiring of such an electromechanical jack 32 may be integrated into the existing wiring hardware of the agricultural implement 16, such as the existing 7-pin lighting wiring harness. For example, the jack 32 may have a 3-wire electrical power wiring with a ground wire, one wire for retracting the jack 32, and another wire for extending the jack 32. However, as can be appreciated, the jack 32 may have any desired electrical wiring.

The switch 34 is connected to the front portion 26 of the frame 18. More particularly, the switch 34 can be located at the hose boom of the hitch 30. The switch 34 may comprise a single toggle switch 34 that can be toggled up or down for retracting or extending the stabilizer 32. Alternatively, the switch 34 can include any desired switch(es), button(s), and/or lever(s). Furthermore, the switch 34 can include an electronic user interface. As discussed above, the operator may manually switch the switch 34 in order to extend or retract the stabilizer 32. If the stabilizer 32 is dually connected to the to the switch 34 and the controller 12, then the switch 34 may function as a manual override for the controller 12.

Figure 4:
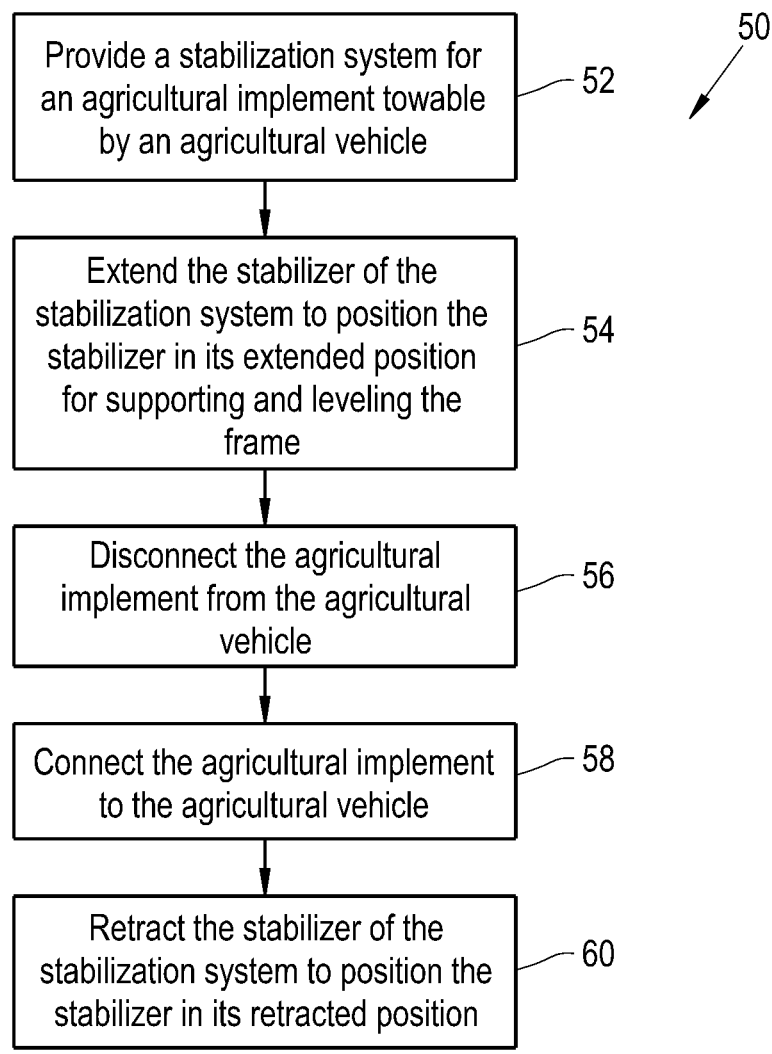
FIG. 4 illustrates a flowchart of a method for stabilizing the agricultural implement, in accordance with an exemplary embodiment of the present invention.

Referring now to FIG. 4, there is shown a method 50 for stabilizing agricultural equipment. By way of example only, the method 50 will be described with reference to the agricultural implement 16 as described above. The method 50 may include an initial step of providing agricultural equipment which should remain constantly level. For example, the method 50 may include a step of providing the agricultural vehicle 16 with the stabilization system 24, as discussed above (at block 52). The method 50 may include a step of extending the stabilizer 32, by the operator manually toggling the remote switch 34, to be in the extended support position for supporting and leveling the frame 18 of the agricultural implement 16 (at block 54). Thereafter or concurrently therewith, the operator may disconnect the agricultural implement 16 from the agricultural vehicle 10 (at block 56). It should be appreciated that the controller 12 may automatically extend the stabilizer 32 upon the operator disconnecting the agricultural implement 16 from the vehicle 10. Thereby, the operator may temporarily store the agricultural implement 16 on its own without needing to counterbalance the hitch 30. As desired, the operator may (re)connect the agricultural implement 16 to the agricultural vehicle 10 (at block 58). Then, the method 50 may include a step of retracting the stabilizer 32, by the operator manually toggling the remote switch 34, to be in the retracted storage position (at block 60). In this step, the controller 12 may also automatically retract the stabilizer 32 upon a movement of the agricultural implement 16. In this regard, the stabilizer 30 may be actuated automatically by the controller 12 and/or manually by the operator from within or outside of the cab of the agricultural vehicle 10.

It is to be understood that the steps of the method 50 can be performed by the operator and/or the controller 12 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 12 described herein, such as the method 50, is implemented in software code or instructions which are tangibly stored on a tangible computer readable medium. The controller 12 loads the software code or instructions via a direct interface with the computer readable medium or via a wired and/or wireless network. Upon loading and executing such software code or instructions by the controller 12, the controller 12 may perform any of the functionality of the controller 12 described herein, including any steps of the method 50 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An agricultural implement towable by an agricultural vehicle, comprising:
   a frame comprising a front portion and a rear portion, the front portion comprising a hitch configured for removably connecting to the agricultural vehicle;
   a plurality of ground engaging tools connected to the rear portion; and
   a stabilization system comprising at least one stabilizer connected to the rear portion, and the at least one stabilizer being remotely operated for selectively supporting the rear portion relative to the front portion and leveling the frame, the rear portion being a section of the frame that is behind a center of mass of the frame.

2. The agricultural implement of claim 1, wherein the at least one stabilizer is extendable in between a retracted storage position and an extended support position wherein the at least one stabilizer contacts a ground surface for supporting a weight of the rear portion.

3. The agricultural implement of claim 2, wherein the stabilization system further comprises a remote switch operably connected to the at least one stabilizer for remotely operating the at least one stabilizer.

4. The agricultural implement of claim 3, wherein the remote switch is connected to the front portion and is configured for being manually switched by an operator.

5. The agricultural implement of claim 4, wherein the agricultural vehicle comprises a controller and the at least one stabilizer is configured for being operably connected to the controller, and the at least one stabilizer is further configured for being manually operated by the operator, from within the agricultural vehicle, by inputting a user command into the controller.

6. The agricultural implement of claim 5, wherein the controller is configured for automatically actuating the at least one stabilizer such that the at least one stabilizer is automatically positioned in the retracted storage position upon a movement of the agricultural implement.

7. The agricultural implement of claim 1, wherein the at least one stabilizer comprises only one stabilizer connected to the rear portion.

8. The agricultural implement of claim 1, wherein the stabilization system further comprises a bracket rigidly mounting the at least one stabilizer to the rear portion.

9. The agricultural implement of claim 1, wherein the at least one stabilizer is in the form of at least one jack.

10. An agricultural vehicle, comprising:
a chassis;
a controller; and
an agricultural implement, comprising:
a frame comprising a front portion and a rear portion, the front portion comprising a hitch removably connected to the chassis;
a plurality of ground engaging tools connected to the rear portion; and
a stabilization system comprising at least one stabilizer connected to the rear portion, and the at least one stabilizer being remotely operated for selectively supporting the rear portion relative to the front portion and leveling the frame, the rear portion being rearward from a center of mass of the frame thereby placing the at least one stabilizer rearward from the center of mass of the frame.

11. The agricultural vehicle of claim 10, wherein the at least one stabilizer is extendable in between a retracted storage position and an extended support position wherein the at least one stabilizer contacts a ground surface for supporting a weight of the rear portion.

12. The agricultural vehicle of claim 11, wherein the stabilization system further comprises a remote switch operably connected to the at least one stabilizer for remotely operating the at least one stabilizer.

13. The agricultural vehicle of claim 12, wherein the remote switch is connected to the front portion of the frame of the agricultural implement and is configured for being manually switched by an operator.

14. The agricultural vehicle of claim 13, wherein the at least one stabilizer is operably connected to the controller, and the at least one stabilizer is further configured for being manually operated by the operator, from within the agricultural vehicle, by inputting a user command into the controller.

15. The agricultural vehicle of claim 14, wherein the controller is configured for automatically actuating the at least one stabilizer such that the at least one stabilizer is automatically positioned in the retracted storage position upon a movement of the agricultural implement.

16. The agricultural vehicle of claim 10, wherein the at least one stabilizer comprises only one stabilizer connected to the rear portion.

17. The agricultural vehicle of claim 10, wherein the stabilization system further comprises a bracket rigidly mounting the at least one stabilizer to the rear portion.

18. The agricultural vehicle of claim 10, wherein the at least one stabilizer is in the form of at least one jack.

19. A method for stabilizing agricultural equipment, comprising:
providing an agricultural implement towable by an agricultural vehicle, the agricultural implement comprising a frame comprising a front portion and a rear portion, the front portion comprising a hitch configured for removably connecting to the agricultural vehicle, a plurality of ground engaging tools connected to the rear portion, and a stabilization system comprising a remote switch and at least one stabilizer connected to the rear portion and operably connected to the remote switch, and the at least one stabilizer being remotely operated for selectively supporting the rear portion relative to the front portion and leveling the frame, the rear portion being a section of the frame that is rearward of a center of mass of the frame;
extending the at least one stabilizer, by toggling the remote switch, to be in an extended support position wherein the at least one stabilizer contacts a ground surface for supporting a weight of the rear portion and preventing the ground engaging tools from resting on the ground surface; and
retracting the at least one stabilizer, by toggling the remote switch, to be in a retracted storage position wherein the at least one stabilizer does not contact the ground surface.

20. The method of claim 19, wherein the agricultural vehicle comprises a controller, and the step of retracting the at least one stabilizer further comprises automatically retracting, by the at least one controller, the at least one stabilizer upon a movement of the agricultural implement.

* * * * *